Dec. 2, 1969 C. F. CASWELL 3,482,086
CONSTANT WRITING RATE VECTOR GENERATOR
Filed June 30, 1967
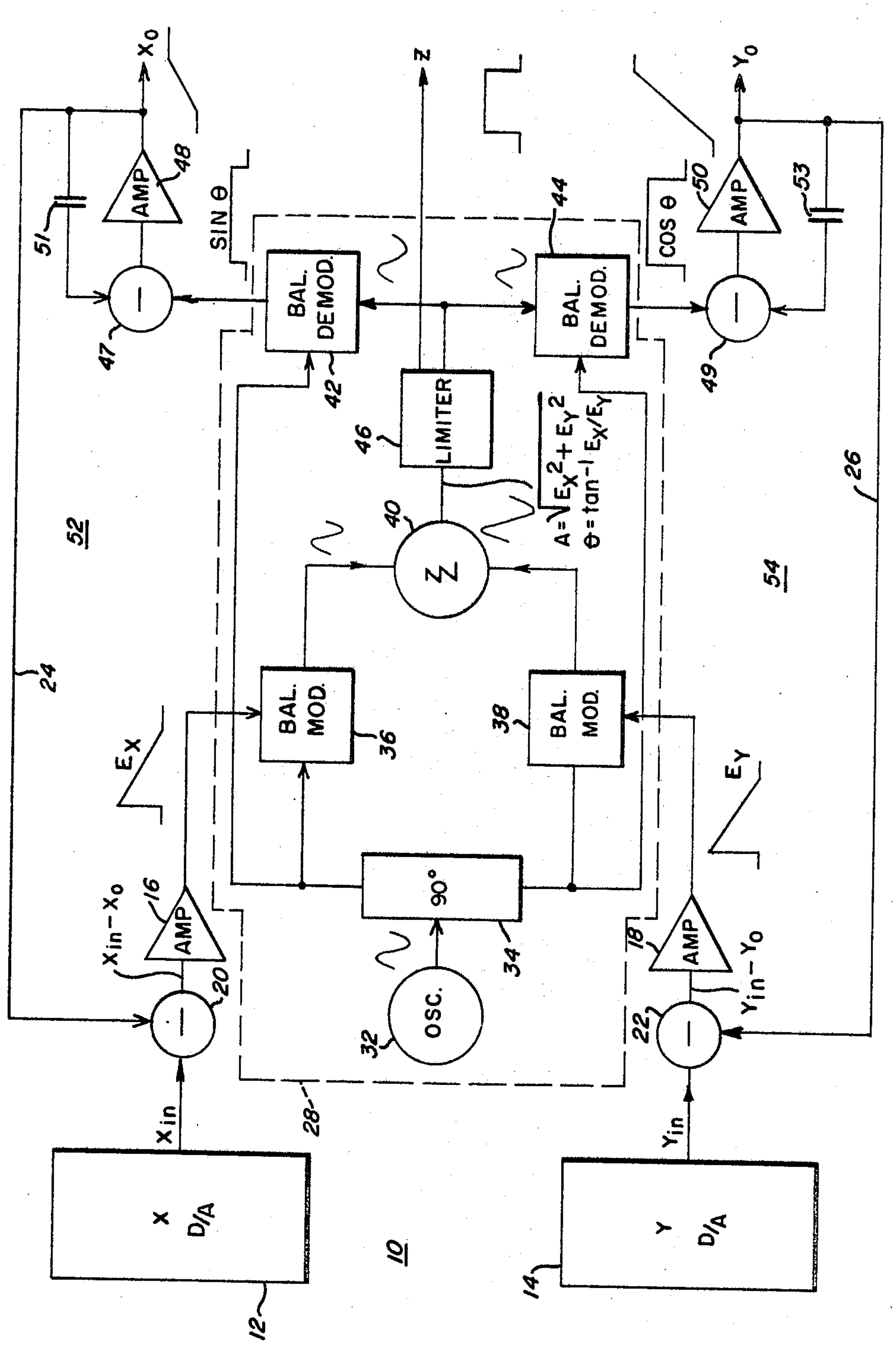
INVENTOR
CHARLES F. CASWELL
BY Irving S. Rappaport
ATTORNEY

United States Patent Office 3,482,086
Patented Dec. 2, 1969

3,482,086
CONSTANT WRITING RATE VECTOR GENERATOR

Charles F. Caswell, Stow, Mass., assignor to Raytheon Company, Lexington, Mass., a corporation of Delaware Filed June 30, 1967, Ser. No. 650,510
Int. Cl. C06g 7/22
U.S. Cl. 235—186 7 Claims

ABSTRACT OF THE DISCLOSURE

A vector generator which permits vectors to be drawn of any length at absolutely constant writing rates. An error-rate-processor is provided which develops an error voltage function in both the X and Y axes which represents the difference between the actual and the command or desired position. The X and Y error voltages are summed in quadrature, normalized, and then separated into X and Y components. By performing this sequence of operations, a continuous sine $\theta$ cosine $\theta$ calculation for the composite error voltage is provided. Integrators reduce the error voltage functions to zero simultaneously and at a normalized rate.

BACKGROUND OF THE INVENTION

The problem of vector generation in a rectilinear coordinate framework, such as a cathode ray tube with fixed X and Y deflection systems, is to simultaneously reduce the component differences to zero in a smooth and continuous manner which guarantees that both the X and Y differences are reduced to zero simultaneously. In addition, for the special problem involved in a cathode ray tube display, it is desirable to keep the absolute closing rate constant in order to eliminate intensity variations due to writing rate changes. To solve this problem of vector generation, the difference between the actual and command positions should be converted to sine $\theta$ and cosine $\theta$ variations which may then be integrated to provide a constant closing rate with correct heading. This problem has not been solved by the prior art.

The prior art is comprised of systems which employ open loop circuits for each of the X and Y axes. In such systems, the actual and command position information is sent through an arithmetic device to derive the DX (change in X) and DY (change in Y) signals which are then normalized, integrated and then summed with the actual position information. However, such systems result in an error in the end point which is proportional to the length of the vector drawn thereby making it necessary to draw the vector in discrete discontinuous segments so as to reduce the size of the error.

According to the present invention, a closed loop system is used for each of the X and Y axes which guarantees end point accuracy. In order to obtain sine $\theta$ and cosine $\theta$ it is necessary to provide quadrature addition of $\Delta X$ (the change in X) and $\Delta Y$ (the change in Y) before normalization is applied. The key to this problem is to translate the X and Y signals into the time-frequency domain simultaneously with intermediate frequency (IF) techniques.

The present invention is characterized by the following features and advantages: (1) constant writing rate; (2) self-determining writing time; (3) guaranteed terminal accuracy; (4) high reliability—minimum number of components; (5) single D.C. coupled channel for the dual function of spot positioning and line drawing; (6) easily adjusted writing speeds—permits the adaptation of this approach to a variety of display devices; (7) fully flexible coding—any coordinates may be specified without restriction; (8) fully optimized operating cycles—the unit is ready to accept new coordinates as soon as the beam reaches the commanded point; (9) minimized storage requirements—only terminal coordinates are necessary in storage; (10) controlled slew rates—slew rates are adjustable to stay within dynamic range of drive amplifiers; (11) continuous function—there are absolutely no discontinuities in the output line regardless of length.

SUMMARY OF THE INVENTION

The above features and advantages of the present invention are achieved by providing a vector generator which permits vectors to be drawn of any length at absolutely constant writing rates. An error-rate-processor is provided which develops an error voltage function in both the X and Y axes which represents the difference between the actual and the command or desired position. The X and Y error voltages are summed in quadrature, normalized, and then separated into X and Y components. By performing this sequency of operations, a continuous sine $\theta$-cosine $\theta$ calculation for the composite error voltage is provided. Integrators reduce the error voltage functions to zero simultaneously and at a normalized rate.

BRIEF DESCRIPTION OF THE DRAWING

The figure shows a block diagram of the vector generator of the present invention.

DESCRIPTION OF THE PREFERRED EMBODIMENTS

A vector generator 10 is shown in a functional block diagram in the figure. The generator 10 includes a pair of X and Y 10-bit digital-to-analog converters 12 and 14 respectively which receive signals corresponding to a specific display coordinate which are labelled $X_{in}$ and $Y_{in}$. The digital-to-analog converters 12 and 14 define the initial positions and at the time the vector is to be drawn they are instantaneously switched to the final positions. Amplifiers 16 and 18 are coupled to the outputs of the digital-to-analog converters 12 and 14 respectively via voltage differencing circuits 20 and 22 respectively. The amplifiers 16 and 18 compare the command positions $X_{in}$ and $Y_{in}$ represented by the outputs from the digital-to-analog converters 12 and 14 with the actual positions $X_0$ and $Y_0$ which are supplied to the differencing circuits 20 and 22 via the feedback lines 24 and 26 respectively. Amplifiers 16 and 18 generate error-function signals $E_x$ and $E_y$ which represent the difference in position between the command signal and the actual signal. The output signals $E_x$ and $E_y$ from the amplifiers 16 and 18 respectively are applied to the IF sine $\theta$-cosine $\theta$ calculator or error rate processor 28 (shown in dotted outline) which converts the signals from the amplifiers 16 and 18 from the space to the time domain.

A reference signal for the IF sine $\theta$-cosine $\theta$ calculator 28 is derived from a constant amplitude oscillator 32 and a 90° phase shifter 34. The frequency of the oscillator 32 will depend on the dynamics of the particular circuit parameters and the problem being solved. The reference signal generated by the oscillator 32 and the phase shifter 34 and the signals $E_x$ and $E_y$ are applied to balanced modulators 36 and 38 permits the vector addition of the nals from the space to the time domain and to produce a sine wave whose phase and amplitude corresponds respectively to the sign and amplitude of $E_x$ and $E_y$. The quadrature relationship of the sine wave inputs to the modulators 36 and 38 permits the vecor addition of the modulator outputs in a summing circuit 40 so as to create a signal proportional to the vector addition of $E_x$ and $E_y$. The two quadrature sine wave reference signals generated by the oscillator 32 and phase shifter 34 are also applied directly to a pair of balanced demodulators 42 and 44.

The output signal from the summing circuit 40 has an amplitude represented by $\sqrt{E_x^2+E_y^2}$ and a phase angle of $\tan^{-1}(E_x/E_y)$. This signal is applied to an IF limiter 46 which separates the amplitude and phase information. The limiter 46 preserves the phase relationship of the input signal applied thereto while guaranteeing a constant amplitude output. A limiter dynamic range of 60 db provides constant amplitude for all error signals over the entire range of a 10-bit digital-to-analog converter. The output from the limiter 46 is applied to the balanced demodulators 42 and 44 and the signal is demodulated by the reference signals which are applied to the demodulators 42 and 44 as generated from the oscillator 32 and phase shifter 34. The output from the demodulators 42 and 44 are D.C. signals corresponding to sine $\theta$ and cosine $\theta$ as derived from the error functions $E_x$ and $E_y$. The sine $\theta$ and cosine $\theta$ outputs from the demodulators 42 and 44 will remain constant for the entire duration of the vector except for second order corrections which may be necessary to guarantee instantaneous heading. Thus, the demodulators 42 and 44 translate the signals from the time domain back into the space domain.

The sine $\theta$ and cosine $\theta$ outputs from the demodulators 42 and 44 of the IF sine-cosine calculator 28 are coupled to amplifiers 48 and 50 via differencing circuits 47 and 49 respectively. The sine $\theta$ and cosine $\theta$ outputs are integrated by the amplifiers 48 and 50 respectively, to reduce the difference between the positions represented by the actual and command position information. This reduction occurs at a rate which is constant in the X–Y plane and which is different between the X and Y axes depending on the heading required. The sine $\theta$ and cosine $\theta$ represent the X and Y spatial components of the unit vector which is heading towards the command position. The amplifiers 48 and 50 are contained within D.C. coupled position loops 52 and 54 between the digital to analog converters 12 and 14 and the position voltage output from the amplifiers 48 and 50, respectively. Capacitors 51 and 53 are connected across amplifiers 48 and 50 respectively for storing the actual positions which are applied to the differencing circuits 47 and 49 together with the sine $\theta$ and cosine $\theta$ signals respectively. The IF limiter 46 generates a blanking function Z waveform. By so monitoring the amplitude signal from the limiter 46 and setting certain limits on it, the circuit can determine the time during which the vector beam is travelling between the actual and command position points. When the signal reaches the threshold of the limiter 46, the writing beam is turned on and when the limiting action of the limiter 46 ceases, the writing beam is turned off.

The circuit described in vector generator 10 including the modulators, demodulators, limiter, integrating amplifiers and summing the differencing circuits are standard circuits for performing the various operations. Such circuits are shown and described in any standard electronics text such as "Electronic Fundamentals and Applications," Ryder, second edition, 1959.

The vector generator 10 guarantees the relative terminal accuracies. When the output position matches the reference voltage from the digital-to-analog converters 12 and 14, the $E_x$ and $E_y$ signals are reduced to zero. Simultaneously, the sine $\theta$ and cosine $\theta$ outputs from the IF sine-cosine calculator 28 are reduced to zero and the final values of the amplifiers 48 and 50 are maintained. The accuracies of the intermediate points are a function of the accuracies of the IF sine-cosine calculator 28. Tests have yielded individual block accuracies of .1% which corresponds to sine $\theta$ and cosine $\theta$ accuracies of .2%. In terms of the angular accuracies these figures correspond to $60° \times .002 = .1°$. Since this error is self-correcting over the entire trajectory of the writing beam, the maximum mid point error corresponding to a full screen diameter line is of the order of .05% at its mid point. The vector generator 10 of the present invention, thus offers three significant performance advantages—terminal accuracies, continuous function, and constant writing rates.

It should be understood, of course, that the foregoing disclosure relates to only a preferred embodiment of the invention and that numerous modifications or alterations may be made therein without departing from the spirit and the scope of the invention.

I claim:

1. A vector generator with which vectors of any length may be drawn at constant writing rates, said generator comprising:

means for processing X and Y axis components of a command position signal;

means for comparing the X and Y command position signal components with X and Y components of an actual position signal in order to produce X and Y space demain error signals;

means for generating reference signals;

means for converting the error signals by modulation with the reference signals from the space domain to a time domain;

means for producing a signal proportional to the vector addition of the X and Y component error signals;

means for converting the error signals from the time domain back to the space domain to produce sine and cosine error functions;

means for reducing the error functions to zero simultaneously and to a normalized rate.

2. A vector generator with which vectors of any length may be drawn at constant writing rates, said generator comprising:

means for converting X and Y axis components of a digital command position signal to X and Y component analog signals;

means for comparing the X and Y component command position signals with an actual position signal in order to produce X and Y space-domain error signals;

means for generating reference signals;

error-rate-processing means for converting the X and Y error signals from the space domain to a time-domain by modulation with the reference signals, for producing a signal proportional to the vector addition of the X and Y component error signals, and for converting the error signals back to a space domain in order to produce sine $\theta$-cosine $\theta$ error functions; and means for integrating the sine $\theta$ and cosine $\theta$ error functions in order to reduce the error functions to zero simultaneously and at a normalized rate.

3. A vector generator as set forth in claim 2 wherein said error-rate-processing means is an intermediate frequency sine-cosine calculator which sums in quadrature, normalizes and separates into X and Y components the error function signals.

4. A vector generator as set forth in claim 3 wherein; said error-rate-processing means includes;

means for generating 90° out of phase reference signals;

means for modulating the X and Y error function signals by applying the reference signals thereto to convert the signals from the space domain to a time domain by producing a sine wave whose phase and amplitude corresponds respectively to the sign and amplitude of the X and Y component error function signals;

means for summing the outputs from said modulating means in quadrature to produce a signal proportional to the vector addition of the X and Y component error function signals;

means for normalizing and separating the output from said summing means; and means for demodulating the signals from said normalizing and separating means by applying said reference signals thereto to produce sine $\theta$-cosine $\theta$ error functions.

5. A vector generator with which vectors of any length may be drawn at constant writing rates, said generator comprising:

means for converting X and Y axis components of a digital command position signal to X and Y analog signal components;

means for differencing the X and Y components of the analog command position signals and X and Y components of an actual position signal in order to produce X and Y space-domain error function signals;

means for generating reference signals;

means for modulating the X and Y error function signals by applying the reference signals thereto to convert the signals from the space-domain to a time domain by producing a sine wave whose phase and amplitude corresponds respectively to the sign and amplitude of the X and Y component error function signals;

means for summing the outputs from said modulating means in quadrature to produce a signal proportional to the vector addition of the X and Y component error function signals;

means for normalizing and separating the output from said summing means;

means for demodulating the signals from said normalizing and separating means by applying said reference signals thereto to produce sine $\theta$-cosine $\theta$ error functions; and means for integrating the sine $\theta$ and cosine $\theta$ functions in order to reduce the error functions to zero simultaneously and at a normalized rate.

6. A vector generator as set forth in claim 4 wherein; said modulating means includes a pair of balanced modulators, each of said modulators corresponding to one of the X and Y error functions respectively and said demodulating means includes a pair of balanced demodulators, each of said demodulators corresponding to one of the X and Y error functions respectively.

7. A vector generator for use in conjunction with a cathode ray tube display, said generator being capable of drawing vectors of any length at constant writing rates, said generator comprising:

digital-to-analog converters for converting X and Y axis components of a digital command position signal to X and Y analog signal components;

differencing circuits for producing the differences between the X and Y components of the analog position signal and X and Y components of an actual position signal in order to produce X and Y space domain error function signals;

an error-rate-processing circuit including an oscillator connected to a phase shifter for producing 90° out of phase reference signals;

a pair of balanced modulators for modulating the X and Y error function signals by applying the corresponding reference signals thereto to convert the signals from the space domain to a time domain by producing sine waves whose phase and amplitude correspond respectively to the sign and amplitude of the X and Y component error function signals;

a summing circuit for summing the outputs from said modulators in quadrature to produce a signal proportional to the vector addition of the X and Y component error function signals;

a limiting circuit connected to the summing circuit for normalizing and separating the summing circuit output;

a pair of demodulators for demodulating the X and Y error functions separated by the limiting circuit by applying said reference signals thereto to produce sine $\theta$-cosine $\theta$ error functions; and integrating amplifiers for integrating the sine $\theta$ and cosine $\theta$ error functions in order to reduce the error functions to zero simultaneously and at a normalized rate, and feedback means for applying the outputs from said integrating amplifiers back to said differencing circuits in order to obtain new X and Y axis error functions.

References Cited

UNITED STATES PATENTS

| | | | |
|---|---|---|---|
| 3,159,943 | 12/1964 | Brouillette et al. | 235—198 |
| 3,341,155 | 9/1967 | Rusk | 235—189 X |
| 3,371,199 | 2/1968 | Schwartzenberg et al. | 235—189 |
| 3,068,467 | 12/1962 | Grimaila. | |

MALCOLM A. MORRISON, Primary Examiner

ROBERT W. WEIG, Assistant Examiner

U.S. Cl. X.R.

235—189; 307—229; 328—148; 340—324